United States Patent
Lüthi et al.

(10) Patent No.: US 10,444,255 B2
(45) Date of Patent: Oct. 15, 2019

(54) METHOD AND SYSTEM FOR DETERMINING THE VELOCITY OF A MOVING FLUID SURFACE

(71) Applicant: photrack AG, Zürich (CH)

(72) Inventors: Beat Lüthi, Zürich (CH); Thomas Philippe, Neuvecelle (FR); Salvador Peña-Haro, Zürich (CH)

(73) Assignee: PHOTRACK AG (CH)

( * ) Notice: Subject to any disclaimer, the term of this patent is extended or adjusted under 35 U.S.C. 154(b) by 0 days.

(21) Appl. No.: 15/524,670

(22) PCT Filed: Nov. 2, 2015

(86) PCT No.: PCT/EP2015/075469
§ 371 (c)(1),
(2) Date: May 5, 2017

(87) PCT Pub. No.: WO2016/071281
PCT Pub. Date: May 12, 2016

(65) Prior Publication Data
US 2018/0299478 A1    Oct. 18, 2018

(30) Foreign Application Priority Data
Nov. 7, 2014    (EP) .................................. 14192230

(51) Int. Cl.
*G01P 5/22*    (2006.01)
*G01P 5/00*    (2006.01)
(Continued)

(52) U.S. Cl.
CPC .............. *G01P 5/22* (2013.01); *G01C 13/006* (2013.01); *G01F 1/002* (2013.01); *G01F 1/7086* (2013.01);
(Continued)

(58) Field of Classification Search
CPC .... G01F 23/292; G01F 23/2928; G01F 1/002; G01F 1/7086; G01F 1/712; C30B 15/20;
(Continued)

(56) References Cited

U.S. PATENT DOCUMENTS 4,136,957 A * 1/1979 Uno ...................... G01B 11/022
356/394
4,729,109 A * 3/1988 Adrian .................... G01P 5/001
356/28
(Continued)

FOREIGN PATENT DOCUMENTS

JP    2001-041803 A    2/2001
JP    2007-223879 A    9/2007
(Continued)

OTHER PUBLICATIONS

International Search Report dated Dec. 4, 2015 in corresponding PCT International Application No. PCT/EP2015/075469.
(Continued)

*Primary Examiner* — Aklilu K Woldemariam
(74) *Attorney, Agent, or Firm* — Ostrolenk Faber LLP

(57) ABSTRACT

A method for determining the velocity of a moving fluid surface, which comprises the following steps S1 to S5: S1) taking a sequence of images of the moving fluid surface by at least one camera; S2) comparing a first image from the sequence with a second image from the sequence in order to distinguish moving patterns of the fluid surface from non-moving parts and to obtain a first processed image (im_1*f*) comprising the moving patterns; S3) comparing a third image from the sequence with a fourth image from the sequence in order to distinguish moving patterns of the fluid surface from non-moving parts and to obtain a second processed image (im_2*f*) comprising the moving patterns; S4) comparing the first and second processed images in order to determine the spatial displacements of the moving
(Continued)

patterns; and S5) determining from the spatial displacements the velocity.

17 Claims, 7 Drawing Sheets

(51) Int. Cl.
| | |
|---|---|
| G01P 5/18 | (2006.01) |
| G01F 1/00 | (2006.01) |
| G01F 1/712 | (2006.01) |
| G01F 1/708 | (2006.01) |
| G01C 13/00 | (2006.01) |
| G06T 7/254 | (2017.01) |
| G06T 7/285 | (2017.01) |

(52) U.S. Cl.
CPC .............. *G01F 1/712* (2013.01); *G01P 5/001* (2013.01); *G01P 5/18* (2013.01); *G06T 7/254* (2017.01); *G06T 7/285* (2017.01); *G01C 13/008* (2013.01); *Y02A 90/32* (2018.01)

(58) Field of Classification Search
CPC .......... G01S 17/48; G01S 15/66; G01S 15/87; G01S 15/8934; G01S 15/8979; G01S 15/8993; G01S 7/52034; G01S 7/52065; G01S 7/52071; G01S 7/52085; G06K 9/38; G06T 7/194; G06T 7/215; G06T 7/60; G06T 7/246; G06T 2207/10016; G06T 2207/30241; G06T 2207/10004; G06T 2207/30004; G06T 2207/30242; G06T 7/0012; G06T 2207/10021; G06T 2207/10056; G06T 7/20; G06T 7/254; G06T 7/285; G03G 15/169; G03G 2215/1666; A61M 5/007; A61M 5/2448; B01F 13/0023; B01F 13/0052; B01F 15/00512; G01C 13/006; G01C 13/008; C12Q 1/6816; C12Q 2563/107; C12Q 2563/155; C12Q 2563/179; G01P 5/001; G01P 5/18; G01P 5/22; C40B 20/04; C40B 40/08; C40B 60/10; C40B 30/04; G01N 15/147; G01N 15/1475; G01N 2015/1447; G01N 2015/1472; G01N 2015/1479; G01N 15/1427; G03F 7/70341; G03F 7/70725; G03F 2009/005; G03F 7/70641; G03F 7/70666; G03F 9/7003; G03F 9/7026; G03F 9/7088; G03F 7/70733; G03F 7/70775; G03F 7/70716; G03F 7/70758; G03F 7/70783; A61B 8/145; A61B 8/483; B05C 3/18
USPC ....... 382/100, 173, 193, 201, 203, 266, 209, 382/142, 151, 288; 356/623, 622, 621
See application file for complete search history.

(56) References Cited

U.S. PATENT DOCUMENTS

| | | | | |
|---|---|---|---|---|
| 6,014,473 A | * | 1/2000 | Hossack | A61B 8/145 348/169 |
| 6,098,029 A | * | 8/2000 | Takagi | G06T 7/60 382/100 |
| 7,359,552 B2 | | 4/2008 | Porikli | 382/190 |
| 8,130,386 B1 | | 3/2012 | Hayashida et al. | 356/623 |
| 8,629,978 B1 | * | 1/2014 | Estevadeordal | G01P 5/22 356/28 |
| 2002/0093641 A1 | * | 7/2002 | Ortyn | G01N 15/1012 356/28 |
| 2005/0018882 A1 | * | 1/2005 | Muste | G01F 1/002 382/107 |
| 2006/0126933 A1 | | 6/2006 | Porikli | 382/173 |
| 2007/0016328 A1 | * | 1/2007 | Ziegler | A47L 5/14 700/245 |
| 2007/0268602 A1 | * | 11/2007 | Mori | G01P 5/001 359/871 |
| 2014/0177932 A1 | * | 6/2014 | Milne | G01N 21/9027 382/128 |

FOREIGN PATENT DOCUMENTS

| | | |
|---|---|---|
| WO | WO 01/51897 A1 | 7/2001 |
| WO | WO 2008/110909 A2 | 9/2008 |
| WO | WO 2014/013064 A1 | 1/2014 |

OTHER PUBLICATIONS

Written Opinion dated Dec. 4, 2015 in corresponding PCT International Application No. PCT/EP2015/075469.
J. Le Coz et al., "Performance of image-based velocimetry (LSPIV) applied to flash-flood discharge measurements in Mediterranean rivers," Journal of Hydrology, vol. 394, pp. 42-52, 2010.
J.D. Creutin et al., "River gauging using PIV techniques: a proof of concept experiment on the Iowa River," Journal of Hydrology, vol. 277, pp. 182-194, 2003.
R.J. Adrian, "Particle-imaging techniques for experimental fluid mechanics," Annual Review of Fluid Mechanics, vol. 23, pp. 261-304, 1991.
I. Fujita et al., "Large-scale particle image velocimetry for flow analysis in hydraulic engineering applications," Journal of Hydraulic Research, vol. 36, No. 3, pp. 397-414, 1998.
M. Muste et al., "Large-scale particle image velocimetry for measurements in riverine environments," Water Resources Research, vol. 44, 14 pages, 2008.
M. Muste et al., "Considerations on direct stream flow measurements using video imagery: Outlook and research needs." Journal of Hydro-Environment Research, vol. 5, pp. 289-300, 2011.
Y. Kim et al., "Stream discharge using mobile large-scale particle image velocimetry: A Proof of concept," Water Resources Research, vol. 44, 6 pages, 2008.
G. Dramais et al.,"Advantages of a mobile LSPIV method for measuring flood discharges and improving stage-discharge curves," Journal of Hydro-Environment Research, vol. 5, pp. 301-312, 2011.
R. Tsubaki et al., "Measurement of the flood discharge of a small-sized river using an existing digital video recording system," Journal of Hydro-Environment Research, vol. 5, pp. 313-321, 2011.
R. Absi, "A roughness and time dependent mixing length equation," Journal of Hydraulic, Coastal and Environmental Engineering, Japan Society of Civil Engineers, vol. 62, No. 4, pp. 437-446, 2006.

* cited by examiner

METHOD AND SYSTEM FOR
DETERMINING THE VELOCITY OF A
MOVING FLUID SURFACE

CROSS-REFERENCE TO RELATED
APPLICATIONS

The present application is a 35 U.S.C. §§ 371 national phase conversion of PCT/EP2015/075469, filed Nov. 2, 2015, which claims priority to European Patent Application No. 14192230.2, filed Nov. 7, 2014, the contents of which are incorporated herein by reference. The PCT International Application was published in the English language.

TECHNICAL FIELD

The present invention relates to a method and a system for determining the velocity of a moving fluid surface by means of at least one camera.

BACKGROUND OF THE INVENTION

Measuring the velocity of a flow is needed in many applications, e.g. when determining the streamflow in an open channel. Such measurements are for instance important in the realm of irrigation, drinking water supply, hydroelectric power production, flood control, reservoir control, sewage systems, preservation of ecosystems, etc. Streamflows can occur in many different types of structures, natural courses, artificial channels, furrows etc. All of them are open-channel flows, i.e. flows having a free surface.

There are many different systems available for measuring the velocity. Systems which are image based possess the advantage that there is no need of expensive installations and they offer more flexibility than other non-intrusive measurements systems.

A long established technique for velocity measurements is the technique of Particle Image Velocimetry (PIV); see e.g. R. J. Adrian, 1991, "Particle-imaging techniques for experimental fluid mechanics." Annual Review of Fluid Mechanics 23, 261-304. Ply is since the work of Ichiro Fujita, Marian Muste, and Anton Kruger (1998, "Large-scale particle image velocimetry for flow analysis in hydraulic engineering applications." Journal of Hydraulic Research 36 (3): 397-414) also known of being applied to large scale free surface flows of flumes or open channels. This flavor of PIV is known to the hydraulic research and engineering community as Large Scale PIV (LSPIV), see e.g.

Muste, M., I. Fujita, and A. Hauet. 2008. "Large-Scale Particle Image Velocimetry for Measurements in Riverine Environments." Water Resources Research 44 (4), and Muste, M., H.-C. Ho, and D. Kim. 2011. "Considerations on Direct Stream Flow Measurements Using Video Imagery: Outlook and Research Needs." Journal of Hydro-Environment Research 5 (4): 289-300.

Recent examples of LSPIV being applied to river flows are described e.g. in patent application WO 2014/013064 A1, Kim, Y., M. Muste, A. Hauet, W. F. Krajewski, A. Kruger, and A. Bradley. 2008. "Stream Discharge Using Mobile Large-Scale Particle Image Velocimetry: A Proof of Concept." Water Resources Research 44 (9), Dramais, Guillaume, Jerome Le Coz, Benoît Camenen, and Alexandre Hauet. 2011. "Advantages of a Mobile LSPIV Method for Measuring Flood Discharges and Improving Stage-discharge Curves." Journal of Hydro-Environment Research 5 (4): 301-12, and Tsubaki, Ryota, Ichiro Fujita, and Shiho Tsutsumi. 2011. "Measurement of the Flood Discharge of a Small-Sized River Using an Existing Digital Video Recording System." Journal of Hydro-Environment Research 5 (4): 313-21.

All these mentioned PIV methods have in common that they require having a well detectable flow tracer of some kind. However, the use of natural or artificial tracers possesses some complications to practically measure the velocity, since the tracers are not generally present and/or cannot be added permanently and continuously.

In the method disclosed in WO 2014/013064 A1 the velocity of the water surface is determined by subtracting two images to obtain a composite image. Subsequently, a suitable threshold is chosen to suppress the non-moving zones and a PIV analysis is performed to determine the velocity of some tracers. Since the displacement of the tracers is determined within the same composite image, their direction of movement is indefinite.

The depth of water can also be estimated using images. In WO 2014/013064 A1 it is proposed to analyze pixel colorimeter to determine the water level. However, using pixel colorimeter can possess some difficulties for analyzing images with poor light conditions. The method described in WO 2014/013064 A1 also needs at least one visual reference object being partially immersed in water, which constrains the places where the system can be installed. In addition, at least 6 reference points which have to be geo-referenced are needed for the camera calibration, in which the external parameters (i.e. position and orientation and at least the internal parameter focal distance) are obtained.

SUMMARY OF THE INVENTION

It is an aim of the present invention to provide for a method and a system which allow determining in a reliable manner the velocity of a moving fluid surface without need of adding flow tracers.

This aim is achieved by the method and the system disclosed herein. Further preferred embodiments of the device and the system according to the invention, as well as computer program and a data medium, are disclosed herein.

BRIEF DESCRIPTION OF THE DRAWINGS

The invention is explained in the following by means of exemplary embodiments with reference to Figures. In the drawings.

DESCRIPTION OF PREFERRED EMBODIMENTS

The following described embodiments concern a method and a system for obtaining the surface velocity field and, if required, the fluid level in an open channel by means of one or more digital cameras. The measured quantities may be combined with a priori knowledge on the geometry of the channel to determine e.g. the discharge or other quantities. The embodiments are described with respect to flowing water, but they are applicable also for other flowing fluids.

An open channel is a conduit with a free surface, i.e. the fluid flowing in the channel has a free surface (e.g. river, stream, artificial channel, furrow, etc.). Streamflow or discharge, Q, is defined as the volumetric rate of flow of the fluid in the channel and is given for instance in units of cubic meter per second. A priori knowledge on the geometry of the channel may include e.g. information on the profile in the spanwise direction of the channel. The information may be e.g. the height H above the surface defining the channel in function of y, where y is the distance in the spanwise direction of the channel, see FIG. 2. In a simple case, where the channel can be considered as having a rectangular profile, information on the distance between the side walls limiting the channel and its depth may be sufficient. Similarly, a channel having a parabolic or trapezoidal profile can be parameterized with only a few, e.g. two, parameters.

Figure 1:
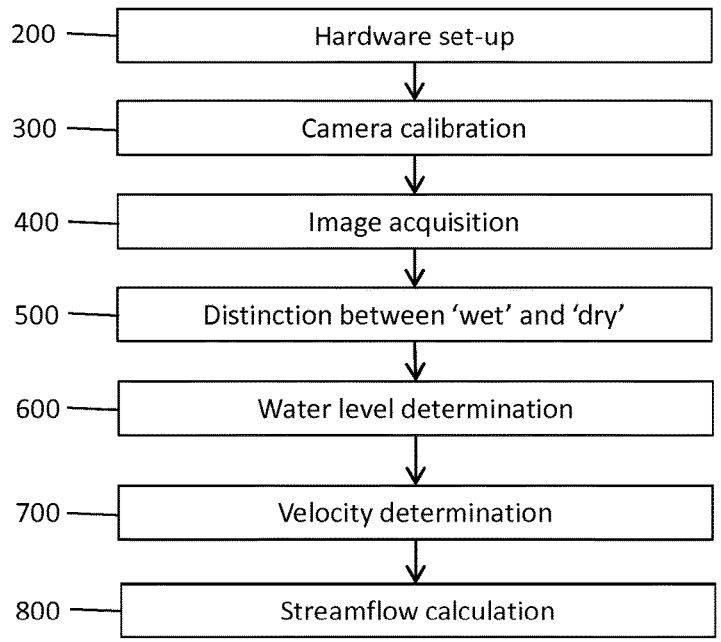
FIG. 1 is a flowchart of steps of a method according to an embodiment of the invention.

The method for determining the velocity and, if required, the streamflow in an open channel comprises the following steps, see FIG. 1:

Step 200: Set-up of the hardware, in particular installation of at least one camera. The camera may be any imaging device which is suitable to provide for a sequence of digital images. Apart from usual digital cameras, it is conceivable to use mobile phones, such as smartphones, or webcameras.

Step 300: Calibration of the camera(s).

Step 400: Image acquisition.

Step 500: Processing of the images acquired in order to distinct between "wet" and "dry" parts of the scene.

Step 600: Water level determination based on the images acquired.

Step 700: Image processing to determine the surface flow velocity.

Step 800: Streamflow calculation.

Figure 2:
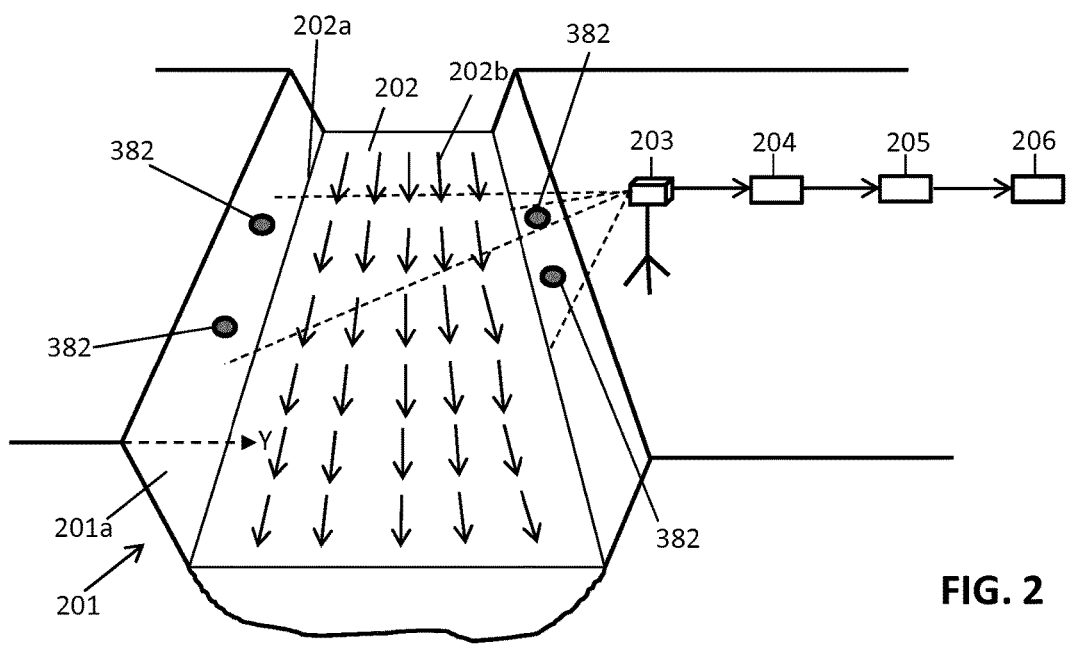
FIG. 2 shows a schematic view of a first embodiment of a system for performing the method illustrated in FIG. 1.
Figure 3:
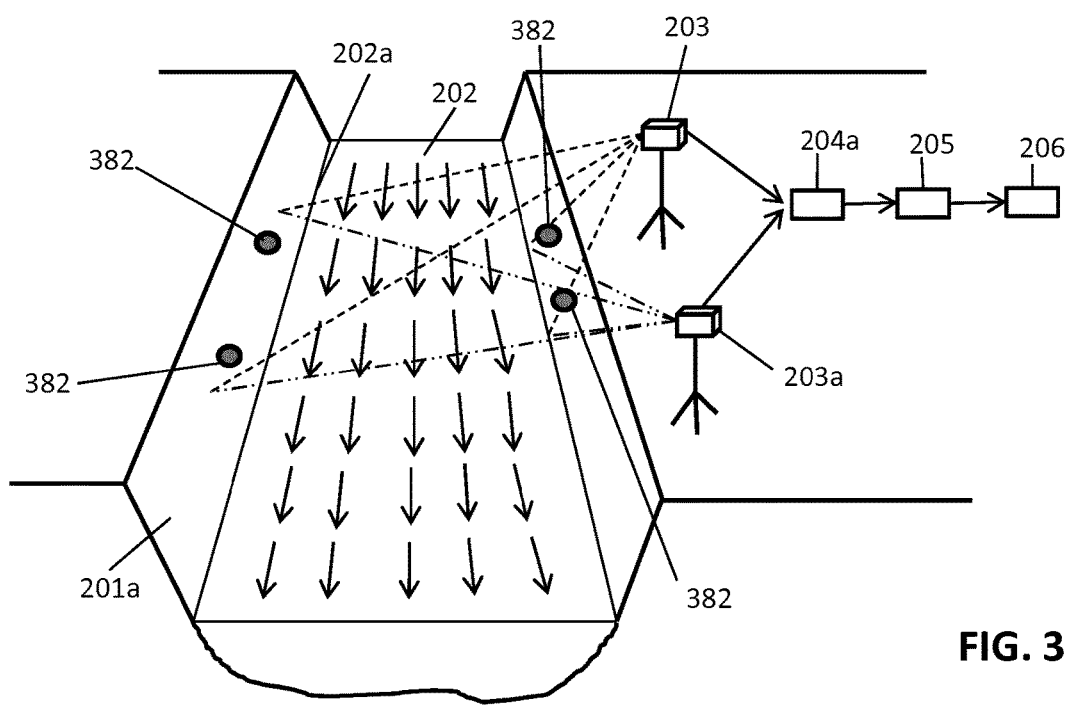
FIG. 3 shows a schematic view of a second embodiment of a system for performing the method illustrated in FIG. 1.

In the following the steps 200-800 are explained in more details in relation to three camera configurations C1, C2, C3:

Camera configuration C1: usage of a single camera 203, which is fixed, see FIG. 2, Camera configuration C2: usage of two cameras 203 and 203a, which are fixed and are arranged for a stereo gauging, see FIG. 3.

Figure 4:
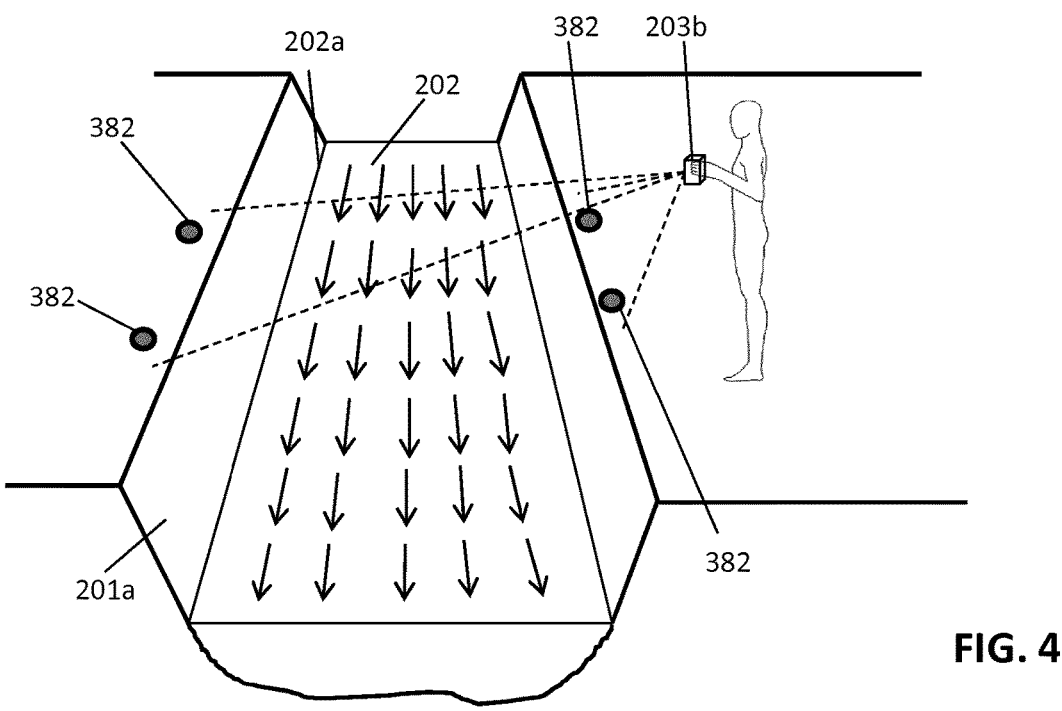
FIG. 4 shows a schematic view of a third embodiment of a system for performing the method illustrated in FIG. 1.

Camera configuration C3: usage of a mobile device 203b, e.g. a mobile phone, hold by a user, see FIG. 4.

Step 200: General Set-Up

FIG. 2 shows schematically an open channel, which is defined by the boundary surface 201. The water flowing in the channel defines a water line 202a, which is given by the intersection of the water surface 202 with the boundary surface 201 of the channel. As the channel is open, the water surface 202 is also denoted as a free surface. The arrows 202b illustrate the velocity of the water surface 202 at different locations.

In the camera configuration C1 one camera 203 is installed at a place, where it can view a section of the water surface 202, which is moving, and a section, which is non-moving, such as a wall 201a being a part of the boundary surface 201 above the water line 200a or another non-moving object being in contact with the water surface 202. The camera 203 does not need to be placed above the open channel; it may be placed on one side of the channel, which makes the installation particularly simple and cheap.

The images acquired by the camera 203 can be stored in a memory 205, which may be e.g. an internal memory of the camera 203 or an external hard disk. Unit 204 in FIG. 2 is a means for transferring the data to the memory 205 and for powering the camera 203. If the memory 205 is an external one, the unit 204 may be connected to the camera 203 by means of a cable, e.g. an Ethernet cable and may be configured such that electrical power is passed via this cable to the camera 203, e.g. in the form of power over Ethernet (PoE).

For processing the images stored, the memory 205 is connected to processing unit 206, which may be any type of computer which is configured to perform the necessary calculations.

In the configuration C2 shown in FIG. 3 two cameras 203 and 203b are arranged such that by means of stereo image processing the water level 202a can be determined without making reference to a non-moving object 201a. Thus, the two cameras 203, 203b may be arranged such that they view the moving water surface 202 only. This configuration makes the system particularly flexible.

The cameras 203 and 203b may be geo-referenced. Depending on the width of the channel this is achieved with a temporary mechanical setup for markers with known world coordinates. For larger channels of the order of 100 m, where the width may prohibit such a mechanical setup, for instance a drone or another aerial vehicle may be employed, which can be seen by a camera 203, 203b, and which can record its position with an accurate DGPS (Differential Global Positioning System).

The cameras 203, 203b are configured such that the velocity is measured for the available field(s) of view. It may or may not cover the entire span-wise direction. In the latter case, a span-wise velocity profile may be fitted to all the available velocity observations. The fitting order depends on the span-wise coverage and the fit obeys the non-slip boundary conditions (i.e. zero velocity) at the channel side walls.

The two cameras 203 and 203a are connected to unit 204a, which may e.g. a switch box for transferring the data to memory 205 connected to processing unit 206 and for powering the cameras 203 and 203a. It is conceivable that the memory 205 and/or the processing unit 206 are integral parts of the camera 203 and/or 203a.

In the camera configuration C3 shown in FIG. 4 a user holds one mobile camera 203b, e.g. a smartphone, such that a section of the water surface 202 and a non-moving object, e.g. part of the wall 201a, is imaged at the same time. If the velocity is to be determined along the channel in the whole spanwise direction, the camera 203b is arranged such that it views at least one border of the surface 202. Preferably, the camera arrangement optimizes the trade of between orthogonal view to the channel wall 201a and between orthogonal view to the water surface 202. This optimum is close to 45 deg inclination to =the water surface 200. If need be, a spanwise velocity profile is fitted to all the available velocity observations to get the velocity data in the whole spanwise direction.

Step 300: Calibration

Figure 5:
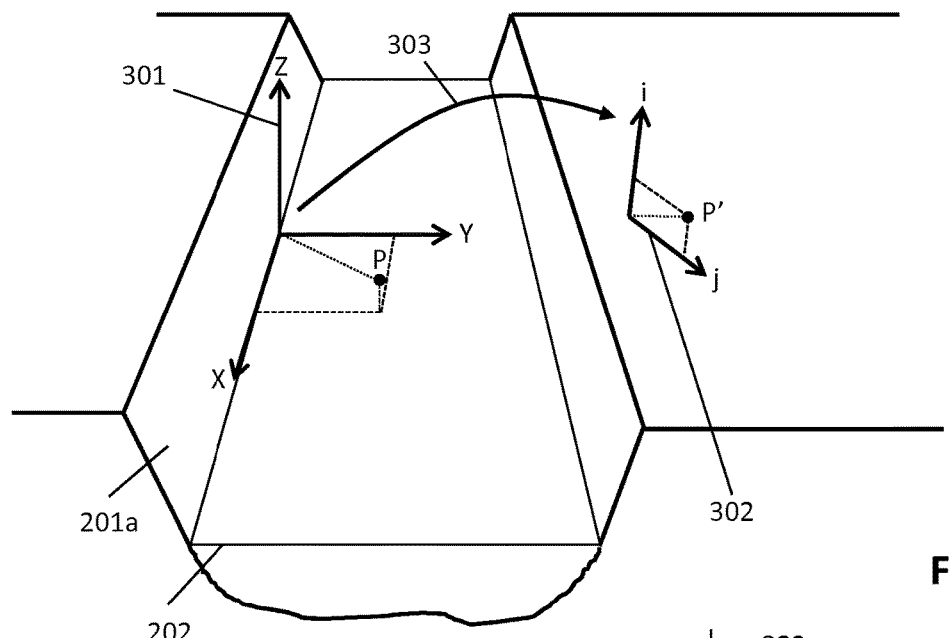
FIG. 5 shows a schematic view of the relationship between world and camera coordinates.

For determining the desired quantities (flow velocity, discharge, etc.) a camera model is used which describes the mathematical relationship between the coordinates of a point in three-dimensional space ("world space") and its projection onto the image plane. As an example FIG. 5 shows a point P in 3D space, which is defined in the coordinate system 301 by specific world coordinates (x, y, z), and P', which is the point P imaged by a camera on the image plane. The location of P' in the image plane may be given by two Cartesian coordinates ("image coordinates") 302 (i, j). The mapping of the coordinate system 301 on the coordinate system 302 is indicated by arrow 303.

In order to fit a camera model to the camera view, a camera is calibrated, in which the external parameters, i.e. position and orientation of the camera, and at least one internal parameter, such as the focal distance are obtained. In the following these external and internal parameters are denoted as "calibration parameters".

One usual possibility for determining the calibration parameters is to provide at least 4 reference points with known world coordinates and to evaluate the points imaged by the camera. For applications, where the scale s of the field of view is large, e.g. s is much larger than 1 m, the world coordinates of the reference points may be determined e.g. by means of DGPS (Differential Global Positioning System).

As reference points e.g. fixed makers can be used, which are positioned at definite locations at the channel and which are configured to be imaged in a way clearly distinguishable from the background. For this purpose, one or more carriers may be used which are provided with spots having a bright color, e.g. white, and a circular or any other predetermined shape.

In the following various examples of calibration methods are explained with respect to FIGS. 2, 3, 4, 6 and 7:

a) Calibration Method Using 2 or More Reference Points:

For one or more fixed cameras, as in the configuration C1 and C2, at least 4 reference points 382 with known world coordinates are provided for, see FIGS. 2 and 3 and imaged by the camera(s). A suitable camera model, e.g. a pinhole model is used, to fit the coordinates of the reference points in 3D space to their coordinates in the image.

In case that there are 4 reference points 382 only, at least one of the following parameters is to be known a priori: the focal distance, the camera's vertical distance relative to the reference points 382, the camera's horizontal distance relative to the reference points 382.

In the pinhole model the camera's aperture is considered as a point, wherein no lenses are used to focus light. The focal length is the distance between the image plane and the pinhole.

In a similar way at least 4 reference points 382 with known world coordinates may be used to calibrate a mobile camera, see FIG. 4. Preferably, the reference points 382 and the free surface 202 are imaged at the same time. In this way, calibration parameters are available for the images based on which the velocity, water line, etc. are to be determined.

Figure 6:
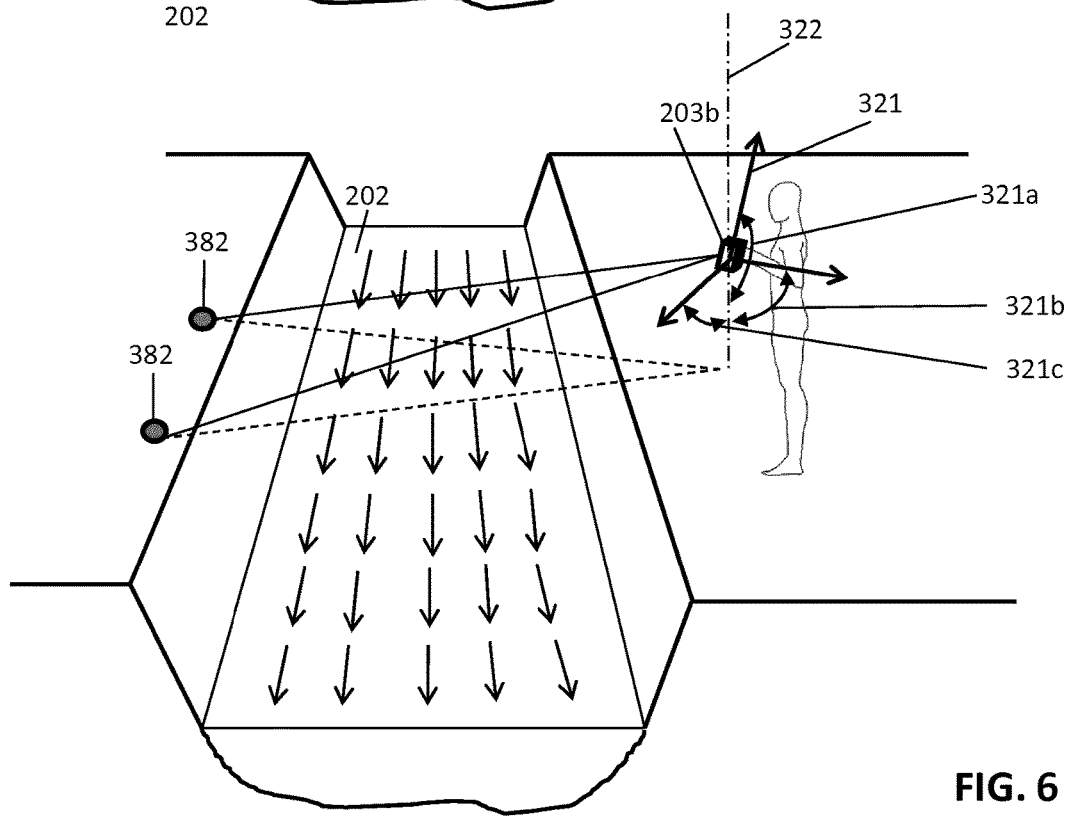
FIG. 6 shows a schematic view of an embodiment for calibrating a camera.
Figure 7:
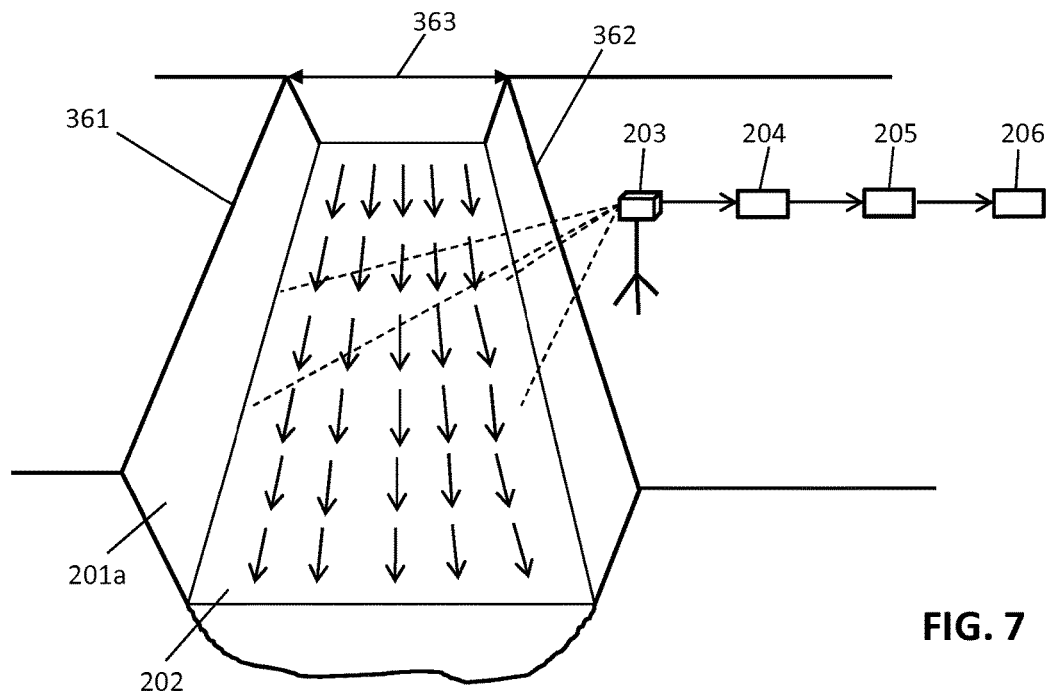
FIG. 7 shows a schematic view of another embodiment for calibrating a camera.

It is conceivable that a priori information of the camera's location is available. For instance mobile devices, in particular smartphones, may have a sensor implemented, for instance an accelerometer, which allows a direct measurement of the orientation of the camera 203b relative to the gravity vector 322. In FIG. 6 three perpendicular axes 321 are depicted which define the reference frame 321 of the camera 203b. Its orientation is defined by the angles 321a, 321b, 321c between the gravity vector 322 and the axes of the reference frame 321. By using the information on the camera's orientation, two external parameters do not need to be fitted by the camera model. Thus, the calibration method can be simplified, as the focal length, or the camera vertical or horizontal distance relative to the reference points 382 does not anymore need to be known a priori, and a set of 4 reference points 382 is fully sufficient to calibrate the pinhole model.

The methods for calibration explained so far have in common that they yield the camera's position relative to a fixed frame, in which the geometry of the channel is defined. The following methods yield the camera position relative to the free surface only.

b) Calibration Method without Usage of Reference Points

A calibration procedure is possible by using a body which has a known length scale and which is floating on the surface 202 when the images are acquired. This body may be e.g. in form of a dumbbell: A bar of definite length has ends which are provided with floating elements, e.g. hollow spheres.

Step 400: Image Acquisition

In the configuration C1 and C2 a camera 203, 203a may be connected e.g. to an Ethernet cable. Energy is supplied to the cameras 203, 203a via PoE. Images are recorded in the memory unit 205 and processed by the processing unit 206.

For determining for instance the water level not only a single image, but a sequence of images are analyzed. The number of images acquired is at least two and may be typically up to 100 or more. Usual digital cameras can take 30 frames per second, thus the sequence of images may last a few seconds.

The images can be recorded in gray values. Depending on the application, a camera with a moderate pixel resolution may be sufficient, e.g. 640×480 pixels.

During night the scene can be illuminated with an infrared beamer.

For allowing a stereo gauging in the configuration C2 the cameras 203, 203a are arranged such that they take images from the same scene. Preferably, they are also synchronized such that they take images at the same time. However, a time difference of one frame, e.g. 1/30 sec, can be accepted for later analysis.

In the camera configuration C3 the necessary images can be acquired by recording a few seconds of movie, e.g. 5 sec. In this configuration C3 the camera 203b is not fixed. The subsequent procedures for water level determination and surface velocity measurements may require that position and orientation of the recording camera is sufficiently constant over the time of the sequence and sufficiently identical to the position and the orientation of the camera during calibration. For hand-held smartphone recordings this may not be the case. Image processing can be used to stabilize the image sequence. One possible method for such a stabilization is as follows:

The camera 203b is hold such that the images acquired contain a significant part that is not water surface 202, i.e. that contains dry shore scenery 201a and preferably the reference points 382 for calibration or other fixed markers, see FIG. 4 or 6. In the smartphone application described below, the software is configured to guide the user such that the top and bottom quadrants of the images, i.e. the region at the four corners of the image, contain only dry scenery. From these "dry" quadrants the relative movement between individual frames is measured by an image cross-correlation. The cross-correlation can be facilitated by markers fixed at the shore. Preferably, these markers are reference points 382, which can be also used for calibration. The resulting motion vectors allow a detection and compensation of the inter-frame movement by image registration (transformation of the data into one coordinate system) or simpler by a combination of image rotation and translation. Alternatively, and to save CPU power, only those images which are at approximately the same position and orientation as during calibration are used for further processing.

Step 500: Distinction Between "Wet" and "Dry" Image Regions

Figure 8:
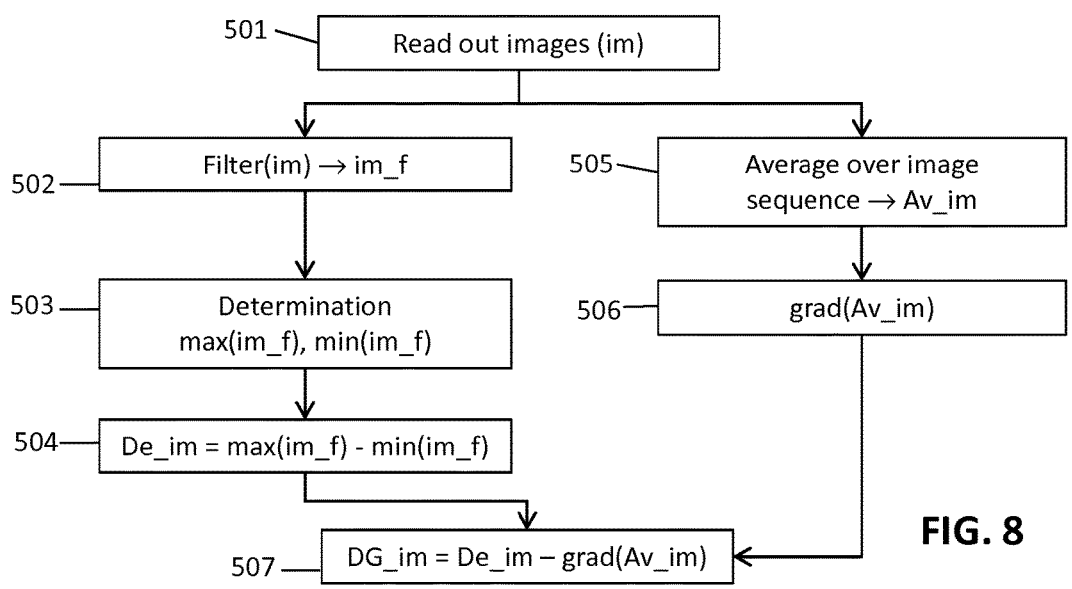
FIG. 8 is a flowchart of the sub-steps of step 500 of the method of FIG. 1, wherein in the images acquired "wet" and "dry" parts of the scene are distinguished from each other.

FIG. 8 is a flow chart of the different sub-steps 501-507 of step 500.

Analyzing not only a single image, but a sequence of images allows discriminating between the "wet" region 202 of the image (i.e. flowing water) and the "dry" region 201a, which views non-moving scenery (e.g. the shore, rocks, part of a bridge pillar, etc.). Any pixels looking to the "dry" parts of the scene will experience little change in their gray values, whereas "wet" parts are subject to constant change, caused by little waves and surface perturbations of the flow. In an ideal camera and in an ideal illumination situation the pixel change in the dry region would be zero. However, in reality, there exists a finite noise level due to non-constant electronic camera gain, due to changing light situations (e.g. when clouds are crossing the sky) as well as due to mechanical vibrations. The electronic noise increases in dark situations, especially during the night when additional light sources like e.g. infra-red diodes are necessary for the cameras to see anything at all.

Thus, after reading the images out from the memory, step 501 in FIG. 8, they are filtered to get data im_f, step 502. Noise may be adequately filtered by using for instance a two-dimensional spatial median filter. The kernel width of the filter is chosen to be larger than the noise, which may be in the order of 1 or more pixels, and smaller than the advected patterns on the surface 202, which may in the order of 10 or more pixels. For instance a kernel of 5 pixel×5 pixel is conceivable.

In order to obtain a scalar measure of the change of each pixel gray value over a defined sequence, the maximum and minimum are determined for each pixel in step 503. This provides image data max(im_f) and min(im_f), respectively.

In step 504, the difference between the maximum and the minimum gray values for a given image sequence is taken to get image data De_im. In quasi-continuous mode, in which data are to be obtained for a longer period of time, a gliding maxima and minima is employed with a kernel width of a given time duration. For instance data are obtained over a period which may last one or more hours, so that the kernel width may be several minutes. A typical kernel width has e.g. a period of 10 minutes. Any extreme event for a pixel will fade out after that the period given by kernel width and it is gradually replaced by its corresponding gliding average value, see step 505.

Depending on the type of scene imaged, additional image processing may be applied to filter out artifacts. For instance the dry region may have relatively sharp transitions between bright and dark areas, e.g. there can be strong local gradients in gray values. Such gradients may be augmented by pixel noise or mechanical camera vibrations. Examples that may lead to such situations are brick walls, rails, trees and other objects, which are non-completely plane flat. Said transitions may lead to an unwanted signal in the "dry" region in the images De_im, such that the water line cannot be determined correctly. To deal with such artifacts, average image data, Av_im, are obtained in step 505 by averaging over the unfiltered image sequence, or, in quasi-continuous mode, by determining the unfiltered gliding average over the image sequence with a specific kernel width, which may be of several minutes.

In step 506, the gradient of Av_im is obtained, denoted by grad(Av_im) in FIG. 8. In step 507, this gradient is subtracted from the "max-min difference", De_im, in order to obtain processed image data DG_im, i.e. DG_im=De_im-grad(Av_im). The distinction between wet and dry regions is enhanced by using the processed image data DG_im, since the artifacts mentioned above are at least partially filtered out.

Step 600: Water Level Determination

Figure 9:
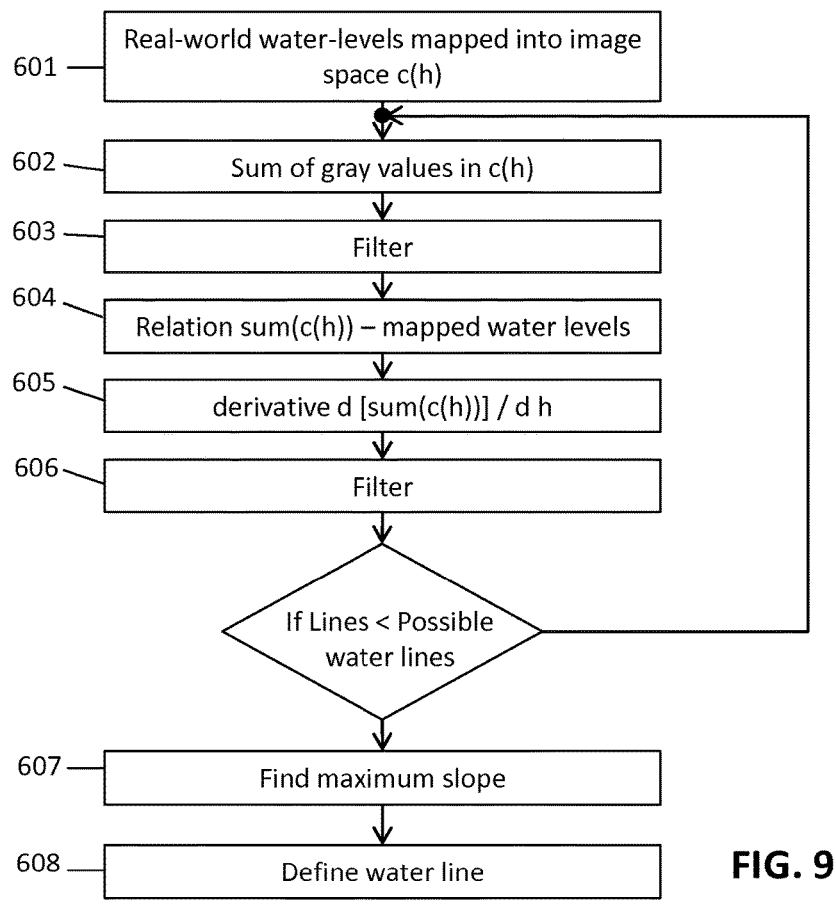
FIG. 9 is a flowchart of the sub-steps of step 600 of the method of FIG. 1, wherein the water level is determined based on the images acquired.

FIG. 9 is a flow chart of the different sub-steps 601-608 of step 600.

For the camera configuration C1 or C3 the water level may be determined as follows:

As the geometry of the shore line and the calibration parameters are known, each possible real-world water-level, h, may be mapped into the image space, c(h), see step 601 in FIG. 9. For plane channel walls this results in straight lines across the image space. However, arbitrary shore line geometries can equally well be mapped onto general curves through the image space. For the calculation the height is discretized, i.e. the calculation is done for an initial value for the height and then repeated by a consecutive increase in the height, see the rhombus "if Lines<Possible water lines" in FIG. 9.

In step 602, the sum of gray values of all pixels belonging to a particular c(h) is determined. Preferably, a filter is then applied, see step 603. A suitable filter is for example a Savitzky-Golay filter, which may be of second order and have a kernel width, w, corresponding to the height of the surface ripples. In one example w is 5 mm.

The sum of gray values may be plotted versus h, which results in a one-dimensional relation sum(c(h))↔h, see step 604.

In step 605, the derivative is determined, d[sum(c(h))]/dh, which is negative and external, where h corresponds to the water level, see step 607 defining that the maximum slope of the function sum(c(h)) is to be found. Preferably before this step 607, the signal sum(c(h)) as well as the derivative d[sum(d(h))]/dh are filtered with a filter width k, see step 606. If k is not larger than the wave-height at the shore-line, the relevant signal is not filtered out and not biased to any direction, i.e. it can be used as a robust indicator for the water-line position.

For the camera configuration C2 a different approach may be used to determine the water level.

A stereo gauging may require that the two cameras look to the same water surface section, i.e. that their views overlap, that preferably the cameras are synchronized in time and that a spatial correspondence between the two camera views can be established, i.e. the angles between the two camera axes is not too large, preferably not larger than 45 degrees.

An image Ã is generated by applying a specific filter. This filter separates the moving surface of the image information from the still image information associated with shades, non-moving objects and channel bottom. The same filter may be used as in steps 702, 703 described in more detail below.

Figure 10:
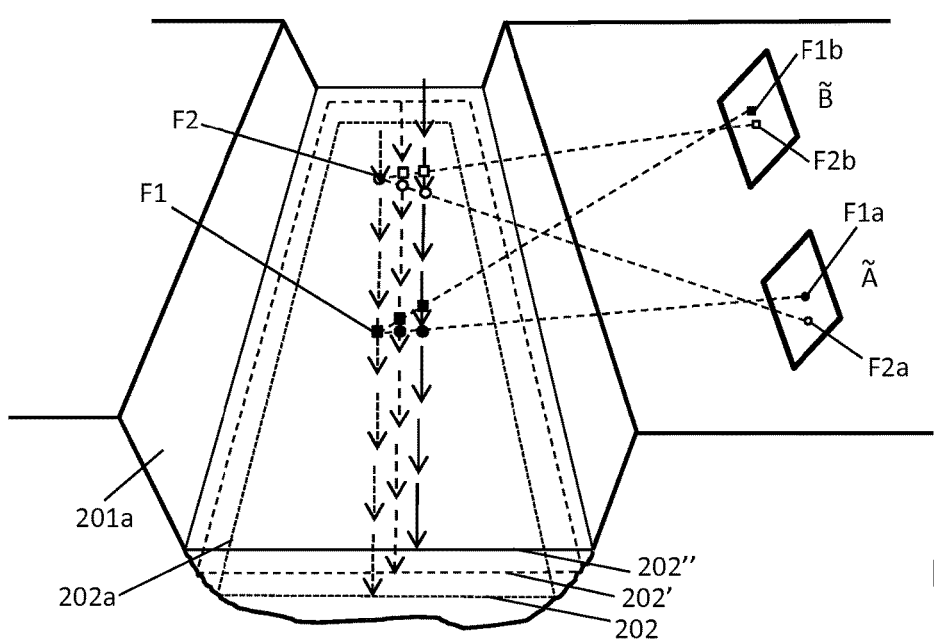
FIG. 10 is a schematic illustration of the method for determining the water level for the embodiment of FIG. 3.

The filtered image Ã, which contains the moving part of the surface only, is projected onto several horizontal planes 202, 202', 202", which each represent potential water levels. Each projection is compared with its corresponding projection from image B̃, which is the filtered image from the second camera. This is illustrated in FIG. 10 in a simplified way with a scene that contains only two features, a "full" feature F1 and an "empty" feature F2. The projections of each feature overlap only for the projection with the correct height, h. In FIG. 10 the features F1 and F2 as seen in image Ã are represented by full and empty circles, F1a and F2a, respectively. The same features in image B̃ are represented by full and empty squares, F1b and F2b, respectively. As can be seen, when projecting F1a, F2a, F1b, F2b onto a plane having an incorrect height, e.g. plane 202', 202", the projection of F1a is separated from F1b and the projection of F2a is separated from F2b. An overlap of F1a and F1b as well as of F2a and F2b is given when they are projected on the plane 202 having the correct height.

In order to quantify the quality of the overlap generally, the correlation between all the projected gray values from image Ã with their corresponding projections from image B̃ may be measured. Thus, the comparison between the projections onto the horizontal plane with the correct height yields a maximum correlation and a minimum mean gray value difference between the corresponding pixels. These extreme points thus identify the correct water level.

In order to reduce the necessary computer processing time, this approach may be modified by working only on a sub-set of pixels. From image Ã a sub-set is projected onto a potential horizontal plane, and from this plane the set is projected onto the virtual image chip of the other camera. Again, the correlation at the positions of the projected sub-set from Ã with the pixels from B̃ is maximal for the correct height of the horizontal plane. Equivalently, the difference of the two point sets is minimal. Working with a sub-set of pixels reduces the processing time by the ratio of the sizes between the sub-set of the image and the entire image.

Step 700: Surface Velocity Field

Figure 11:
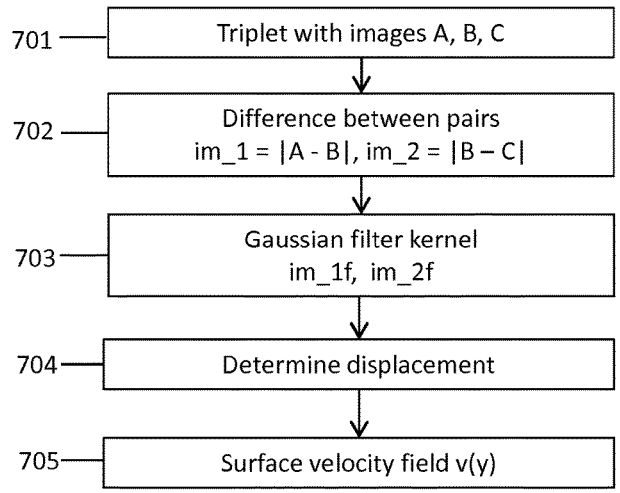
FIG. 11 is a flowchart of the sub-steps of step 700 of the method of FIG. 1, wherein the surface flow velocity is determined.

FIG. 11 is a flow chart of the different sub-steps 701-705 of step 700.

The method as explained in the following allows the surface velocity field to be measured. This method will also be designated as Filtered Delta Image Velocimetry (FDIV).

If the bottom of the channel is visible through the water phase, if shades or scenery reflections are visible on the water surface, and/or if non-moving objects like standing waves or solid rocks or bridge pillars "contaminate" the image scene, standard PIV does not work, as it would measure some value between zero and the actual surface velocity.

FDIV is capable to separate in a robust fashion the moving image contents from the still image contents. The functionality of FDIV does not require the addition of flow tracers.

The image sequence taken by a camera is grouped into image triplets, each containing a first image A, a second image B, and a third image C, see step 701.

For instance at time t_1 an image I_1 is acquired, at a later time t_2 an image I_2, at a further later time t_3 an image I_3, etc. This gives a series of images I_1, I_2, I_3, etc. The first triplet may be formed for instance by (I_1, I_2, I_3), the second triplet by (I_2, I_3, I_4), the third triplet by (I_3, I_4, I_5), etc. However, it is conceivable that the triplets are formed in a different way: For instance none of the images of a triplet may be contained in the next triplet, e.g. (I_1, I_2, I_3), (I_4, I_5, I_6), and/or there may be gaps within a triplet, e.g. (I_1, I_3, I_5). Each triplet will give data on the velocity field for one instant of time. In general, a triplet is formed by (I_i, I_j, I_k), wherein i<j<k.

In the following processing of one triplet (A, B, C) is explained.

In step 702, the absolute difference between A and B and the absolute difference between B and C is formed giving im_1 and im_2, respectively.

In step 703, im_1 and im_2 are filtered to produce im_1f and im_2f. A spatial Gaussian kernel may be e.g. used as a filter. The filter width is chosen large enough so as to remove difference noise in im_1 and im_2 and to distribute or smear small features in their respective proximities from im_1f to im_2f. On the other hand, the filter width is chosen small enough in order not to completely remove the motion signal in im_1f and im_2f. The upper bound for the filter width may correspond to the minimal sub-window size that is defined for the following processing step 704. In order to detect motion displacement of scale d in units of pixels, the sub-window scale s in units of pixels is chosen such that it is at least twice d or larger: s≥2d.

In step 704, the spatial shift of patterns from im_1f to im_2f is determined.

The images im_1f and im_2f are divided into sub-windows with size n×m ("interrogation window"). Basically, a sub-window of im_1f is compared with the a sub-window of im_2f in order to find a displacement giving the best match between the two sub-windows. The degree of match may be determined by means of the cross-correlation function of im_1f and im_2f:

$$R(x, y) = \sum_k \sum_l im\_1f(k, l) \times im\_2f(k + x, l + y)$$

In order to calculate the cross-correlation function, the image data are converted to the spectral domain, i.e. Fourier space by using e.g. a Fast Fourier Transform.

The Fourier transform of im_1f is multiplied with the Fourier conjugate transform of im_2f and then the inverse Fourier transform is applied. This gives for each sub-window an impulse-like function for R(x,y). The location of the impulse relative to a sub-window center relates to the relative pixel displacement between the sub-windows of im_1f and im_2f. The obtained displacement vectors at discrete positions are finally mapped from pixel space to world space by employing a camera model that is obtained with one of the above described calibration methods.

Alternatively, im_1f and im_2f may first be registered into world space, i.e. the image coordinates are converted to the world coordinates. Subsequently, the maximum of the cross-correlation function for each sub-window and the corresponding surface velocity are determined in an analogous way as explained above. The latter flavor allows one to choose more flexible aspect ratios for the n*m sized sub-windows, as now the sub-window sides can be chosen exactly parallel and orthogonal to the flow direction. On the other hand image registration in world space is more CPU costly than just mapping the velocity vectors from pixel space into world space.

Figure 13A:
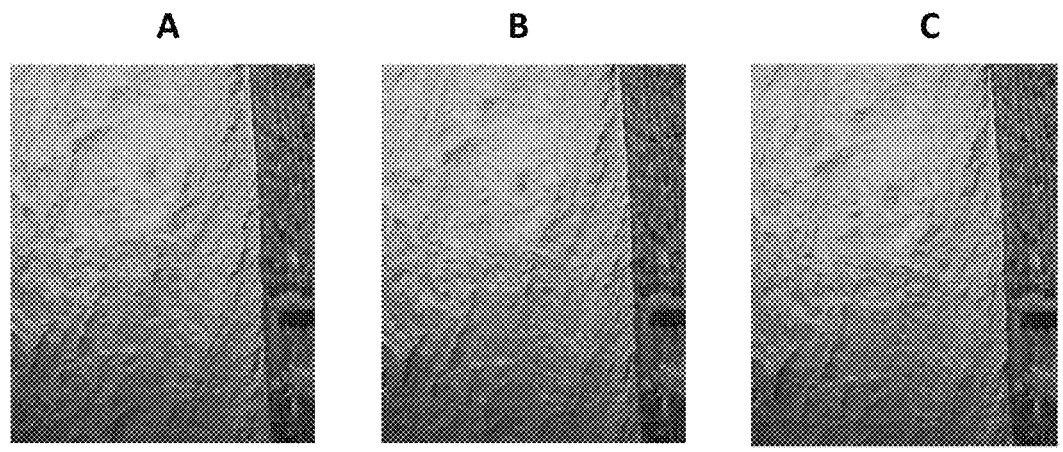
Figure 13B:
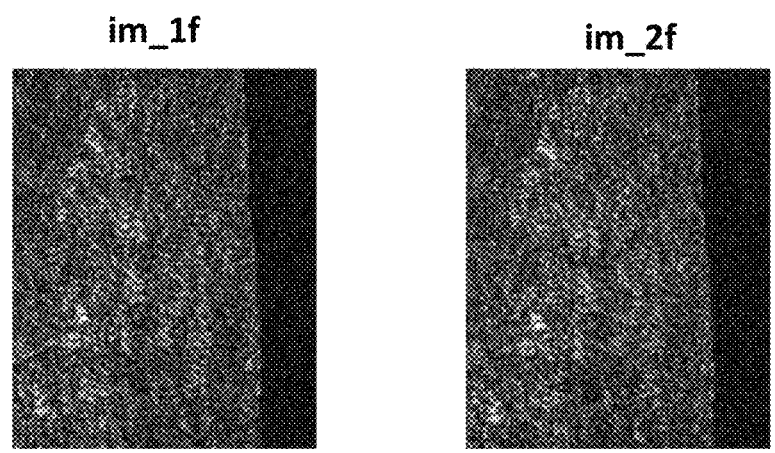
Figure 13C:
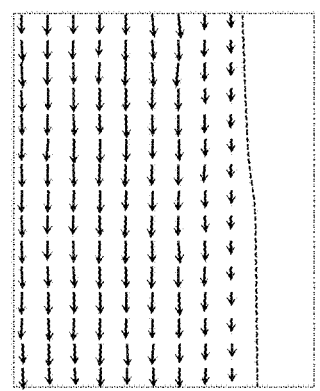

FIG. 13a-13c show an example of the images processed by the step 700 for determining the surface velocity. The three images A, B, C in FIG. 13a show part of a river and of a shore at three consecutive instants of time. FIG. 13b are the two images im_1f and im_2f obtained after applying steps 702 and 703. Processing of these two images according to steps 704 and 705 gives the velocity of the surface at different locations on the river as shown in FIG. 13c.

In an alternative method of steps 701 and 702 a group of four different images of the image sequence is taken to determine the difference: im_1=|A−B_1| and im_2=|B_2−C|, where B_2 is an image acquired after the image A and preferably also B_1 have been acquired.

Step 800; Streamflow Calculation from Water-Level and Surface Velocity

Figure 12:
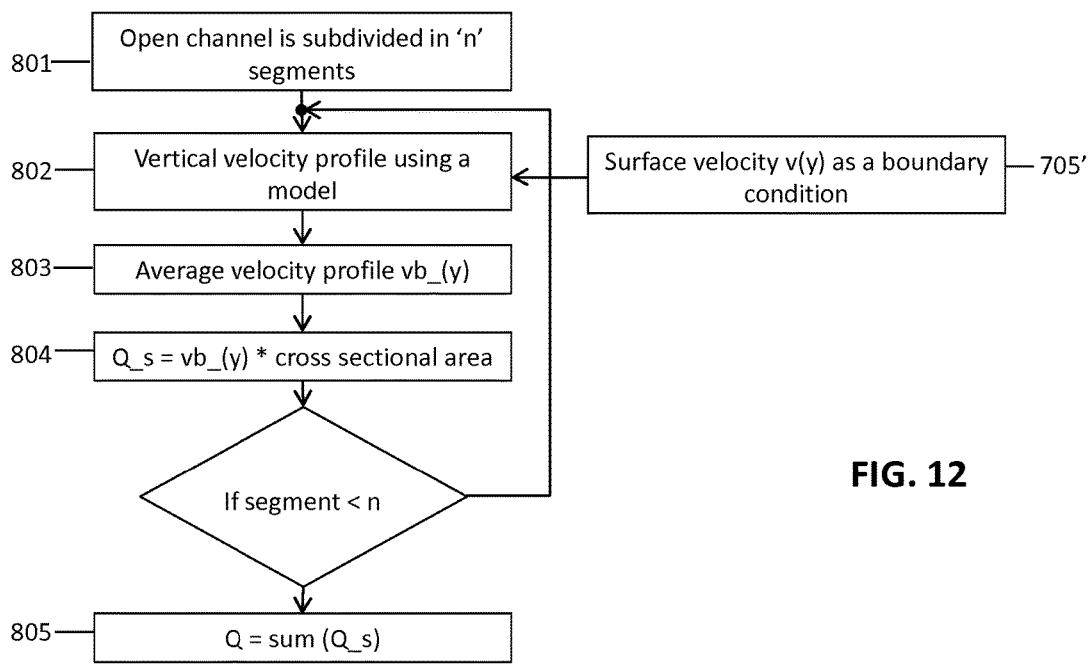
FIG. 12 is a flowchart of the sub-steps of step 800 of the method of FIG. 1, wherein the discharge is determined, and FIG. 13a-13c refer to an example of three images, which are processed according to the method step 700 of FIG. 1.

FIG. 12 is a flow chart of the different sub-steps 801-805 of step 800.

In order to determine the discharge Q, information on the velocity profile along the vertical direction is needed. Such information may be obtained by using a model, for instance a roughness dependent mixing length model as suggested by R. Absi, "A roughness and time dependent mixing length equation", Journal of Hydraulic, Coastal and Environmental Engineering, Japan Society of Civil Engineers, Vol. 62, 2006, pages 437-446. In this model, the velocity profile along the vertical profile is estimated by integrating a so-called roughness dependent mixing length model from the channel bottom all the way to the water surface. The mixing length and kinetic energy are modeled as functions of the height above the bottom and they define the local slope of the velocity profile. The initial slope at the channel bottom, i.e. the bottom boundary condition, is a function of the so-called roughness velocity and of the bottom roughness height. In order to meet the water surface, i.e. to satisfy the top boundary condition, the integration is iterated to find the correct roughness velocity.

The water-level and the surface velocity field are combined with the model to obtain vertical velocity profiles and successively, the sought after discharge values Q.

The span-wise direction, y, of the open surface flow is divided into n segments, step 801 in FIG. 12.

In step 802, for each segment the vertical velocity profile is modeled with the boundary conditions of the free surface velocity v(y) as measured (step 705'), the no-slip condition at the bottom (i.e. zero velocity) and the bottom roughness height. The average of each velocity profile results in a bulk velocity vb_(y) in step 803, which multiplied with its corresponding cross sectional area of the segment, yields the discharge Q_s for each span-wise segment, step 804. The sum over all Q_s finally is the discharge Q, step 805.

The bottom roughness height affects both, the water level and the surface velocity of an open surface flow. The present method allows measuring both these quantities independently. For stream sections with sufficiently little change in stream-wise direction, the surface roughness of the bottom may also be determined by the present method itself, rather than "only" be used for the determination of the resulting discharge.

In the following specific applications of the method are described in more detail:

Fixed Camera(s), and Pan, Tilt, Zoom (Web-)Camera(s):

In one application, three rigidly mounted webcams measured the water-level and the surface velocity field across the entire river at quasi-continuous intervals of 2 seconds. At regular intervals of 10 minutes the information has been combined to estimate the discharge. Three cameras were used to better resolve the entire span wise channel width and the channel wall. Alternatively, just one camera may be used, which has a larger field of view and/or which may be pan, tilt and zoom controllable.

By using e.g. a 70 Watt infra-red beamer for illumination, the method worked also during the night. Thus, the method may be configured for an all year round usage, i.e. 24 hours×7 days, to determine the surface velocity and the discharge of free surface flows. The addition of flow tracers was not necessary and a particular constructions for camera mounting over the river was not required. It is enough if the cameras are mounted at the river side and that they can "see" the water surface and the shore-line.

For additional flexibility instead of web cameras non-movably arranged, cameras can be used with controllable pan, tilt and zoom positions. As long as each position can be reliably saved and reached again, calibration can be performed for each position and from here on the method is the same as the above described fixed camera method. However, the number of cameras may be reduced to only one single camera.

Fixed Stereo (Web-)Cameras and Pan, Tilt, Zoom (Web-)Cameras

With the above described method of stereo-gauging, see FIG. 3, a camera pair can be aligned to view a common section of the open surface to directly determine the water level without the need to see the shore-line.

With cameras that allow controlling pan, tilting and zooming positions, it is possible to successively scan the entire width of the surface flow. Thus, it is possible to measure with just 2 cameras water-level and surface velocity of the entire surface flow, which allows one to determine the discharge independent of the shore-line visibility.

Smartphone Implementation

The above methods, preferably combined with a suitable way to either stabilize images or to identify those image triplets which are relatively stable, can be implemented into a smartphone application. The calibration needs to be performed each time, but on the other hand, calibration is also simplified thanks to the use of the accelerometer sensor that is standard even on the cheapest smartphones. In addition, via GPS, also standard on all smartphones, the measurement location is automatically determined and it is thus straight forward to use the same application for any number of measurement locations.

For calibration, each channel measuring site will be equipped with n fixed markers of scale, which may be in the order of 1 cm or more. The markers positions relative to each other and relative to the channel geometry need to be measured once. Also the channel geometry needs to be measured once. The computer program for the mobile device ("app") is designed to guide the user towards an approximate position relative to the channel and to the calibration marks for calibration. The actual recording occurs over a time of period which is in the order of 1 sec or more. This is enough to determine water level and water surface velocity, from which the discharge can be determined.

The method and system described so far have various advantages:

- The measurement does not require the addition of flow tracers nor the presence of permanent structures in the fluid. Measurement is possible also in conditions where non-moving shades, reflections, standing waves, or solid objects are a significant part of the image.
- It is sufficient to acquire monochromatic images, e.g. gray images. Such images are better suited for difficult light conditions than color images.

Measurement is possible even during night by using e.g. an infrared beamer.

Water level determination is based on the separation of wet and dry parts of the image via analysis of a sequence of images rather than one single image.

The calibration uses a minimum of 4 reference points in the case of a mobile camera with a fixed focal length; and, if the viewing angle of the camera relative to the horizontal plane is available, only 2 points are needed.

Measurement can be done also by means of a mobile camera, e.g. a camera in a mobile phone.

The method and system is applicable in environmental, hydraulic, hydrological and other areas.

From the preceding description, many modifications are available to the skilled person without departing from the scope of the invention, which is defined in the claims.

The method for determining the velocity of a moving water surface is applicable for any kind of fluid, not only water.

Depending on the application, the method may be performed without the steps for determining the fluid level and/or discharge.

Illumination by means of a lightening device, e.g. an infrared beamer is generally conceivable in cases, where the environmental light is insufficient, e.g. also in an closed environment such as a sewage system.

The invention claimed is:

1. A method for determining velocity of a moving fluid surface, comprising the following steps S1 to S5:
    S1) receiving by a processor a sequence of digital images of the moving fluid surface taken by at least one digital camera;
    S2) comparing, with the processor, a first digital image from the sequence of digital images taken at time t1 with a second digital image from the sequence of digital images taken at time t2 by building the absolute difference between the first digital image and the second digital image in order to distinguish fluid moving patterns of the fluid surface from non-moving fluid and non-moving non-fluid parts and to obtain a first processed image comprising the fluid moving patterns, wherein t2 is later than t1;
    S3) comparing, with the processor, a third digital image from the sequence of digital images taken at time t3 with a fourth digital image from the sequence of digital images taken at time t4 by building the absolute difference between the third digital image and the fourth digital image in order to distinguish said fluid moving patterns of the fluid surface from non-moving fluid and non-moving non-fluid parts and to obtain a second processed image comprising said fluid moving patterns, wherein t3 and t4 are later than t1 and wherein t4 is later than t3;
    S4) comparing, with the processor, the first and second processed images in order to determine the spatial displacements of said fluid moving patterns; and
    S5) determining, with the processor, from the spatial displacements, the velocity,
    wherein in step S4 spatial displacements are determined by evaluating a cross-correlation between subwindows of the first and second processed images.

2. The method of claim 1, wherein, for obtaining the first processed image and/or the second processed image in step S2 and/or S3, at least one of the following steps is performed:
    the second image is used as the third image, so that t2 corresponds to t3,
    the first, second, third and fourth images are provided as monochromatic images,
    the absolute difference between the first image and the second image is built and preferably filtered by applying a bandpass filter, in particular a Gaussian filter,
    the absolute difference between the third image and the fourth image is built and preferably filtered by applying a bandpass filter, in particular a Gaussian filter.

3. The method according to claim 1, wherein the fluid flows through an open channel, preferably the channel's geometry being given in world coordinates and/or preferably the method further comprising at least one of the following steps:
    determining the spanwise profile of streamwise velocity,
    determining the level of the fluid surface,
    determining the discharge of the fluid through the channel.

4. The method of claim 3, further comprising the following steps for determining the level of the fluid surface:
    comparing at least two images from the sequence taken at different times in order to obtain a comparative image distinguishing the fluid parts imaged from the non-fluid parts imaged,
    mapping a boundary defined in the world coordinates at different heights to the image coordinates of the at least one camera by means of a camera model in order to get mapped boundaries,
    comparing the mapped boundaries with the imaged boundary in the comparative image defining the transition from the fluid parts to the non-fluid parts, and
    determining out of the mapped boundaries the boundary which best fits to the imaged boundary.

5. The method of claim 4, wherein at least one of the following steps is performed:
    determining the extreme values of corresponding pixels in the at least two images or in at least two processed images obtained in steps S2 and S3 and building the difference between the extreme values to get a difference image, which comprises pixels having a value above a given threshold defining a fluid part and pixels having a value below the threshold defining a non-fluid part,
    building the gradient of the average over the at least two images and subtracting it from the difference image,
    determining the maximum slope of the function, which is given by the sums built by summing up the values of the pixels defining a mapped boundary.

6. The method according to claim 3, wherein, for determining the level of the fluid surface, a first camera and at least a second camera are used to image at least a section of the fluid surface in the open channel by stereo gauging, wherein steps S1 and S2 are carried out for the at least two cameras to obtain a processed image for the first camera and a processed image for the second camera, the processed images comprising moving patterns of the fluid surface, wherein at least part of the processed images are projected on a plane at different heights to obtain projected images, comparing the projected images in order to find the plane for which the projected image of the first camera fits best with the projected image of the second camera.

7. The method according to claim 3, wherein the variation of the fluid velocity in the vertical direction is modeled by using a mathematical model, the method further comprises at least on the following steps:
    determining the discharge based on the mathematical model with the velocity determined in step S5 as a boundary condition and based on the information obtained for the level of the fluid surface, determining at least one parameter related to the hydrodynamic roughness of the channel by means of the mathematical model, the information on the velocity determined in step S5 and the information obtained for the level of the fluid surface.

8. The method according to claim 4, wherein a relationship between the world coordinates and image coordinates is established by means of at least one of the following steps:

at least two reference markers with a given distance therebetween are imaged by the at least one camera, the at least two reference markers being arranged on the channel above the fluid surface or being arranged in a floating manner on the fluid surface, information are used provided by a sensor measuring the orientation of the at least one camera, information are used provided by a GPS receiver measuring the location of the at least one camera.

9. The method according to claim 1, wherein in step S1 at least one of the following items are used:

at least one camera, which is firmly or movably arranged on a fixed surface, a mobile device, in particular a mobile phone, held by a user.

10. The method according to claim 9, wherein fixed correction markers together with the fluid are imaged by a mobile device in step S1, wherein, for reducing the effect of a movement of the mobile device during taking the images, the position of the imaged correction markers are compared in order to transform the images used for the following steps S2 to S4 such that a spatial displacement of the imaged correction markers is reduced and/or in order to disregard for the following steps S2 to S4 those images, for which the spatial displacement of the imaged correction markers are above a given threshold.

11. The method according to claim 1, wherein in step S1 the fluid is illuminated by means of a lightening device, in particular an infrared beamer.

12. A system comprising at least one imaging device for taking a sequence of images and a computing device comprising a memory and a processing unit, wherein the computing device is equipped with a computer program, on the running of which the method according to claim 1 can be carried out.

13. The system according to claim 12, which comprises a mobile device, in particular a cellular phone or a tablet, the mobile device comprises at least one of the following components:

a built-in camera;

a GPS receiver for determining the location of the mobile device;

a sensor for determining the orientation of the mobile device;

an accelerometer;

the computer program, which is preferably in form of an app.

14. The system according to claim 12, wherein the direction and/or zoom of the at least one imaging device is controllable, preferably the at least one imaging device is a pan-tilt-zoom camera.

15. The system according to claim 12, further comprising a calibration body, which comprises a predetermined length scale and is configured to float on the fluid surface, preferably the calibration body is in the form of a dumbbell.

16. A computer program, wherein on running thereof on a computer the method according to claim 1 is carried out.

17. A data medium on which the computer program according to claim 16 is stored.

* * * * *